(12) United States Patent
Knoll et al.

(10) Patent No.: US 10,300,664 B2
(45) Date of Patent: May 28, 2019

(54) METHOD AND A DEVICE FOR THE WELDING OF TWO PARTS TO BE JOINED MADE OF THERMOPLASTIC SYNTHETIC MATERIALS ALONG A WELD SEAM BY MEANS OF LASER

(71) Applicant: LPKF Laser & Electronics AG, Garbsen (DE)

(72) Inventors: Benjamin Knoll, Alesheim (DE); Michael Jonathan Schwalme, Fürth (DE); Manuel Sieben, Fürth-Vach (DE)

(73) Assignee: LPKF Laser & Electronics AG, Garbsen (DE)

( * ) Notice: Subject to any disclaimer, the term of this patent is extended or adjusted under 35 U.S.C. 154(b) by 226 days.

(21) Appl. No.: 15/316,304

(22) PCT Filed: May 27, 2015

(86) PCT No.: PCT/EP2015/061724
§ 371 (c)(1),
(2) Date: Dec. 5, 2016

(87) PCT Pub. No.: WO2015/185415
PCT Pub. Date: Dec. 10, 2015

(65) Prior Publication Data
US 2017/0157839 A1    Jun. 8, 2017

(30) Foreign Application Priority Data

Jun. 3, 2014  (DE) .................. 10 2014 210 486

(51) Int. Cl.
*B29C 65/16* (2006.01)
*B29C 65/00* (2006.01)
*B29K 701/12* (2006.01)

(52) U.S. Cl.
CPC ...... *B29C 65/1661* (2013.01); *B29C 65/1612* (2013.01); *B29C 65/1635* (2013.01);
(Continued)

(58) Field of Classification Search
CPC .................................................. B29C 65/1661
See application file for complete search history.

(56) References Cited

U.S. PATENT DOCUMENTS

2009/0211700 A1    8/2009  Terada et al.
2014/0150953 A1*   6/2014  Sieben .............. B29C 65/1638
                                                           156/64

FOREIGN PATENT DOCUMENTS

DE    102004056782 A1    6/2006
DE    102007049362 A1    4/2009
(Continued)

OTHER PUBLICATIONS

Olowinsky, "Vortrag Technologieseminar 2008 Verfahrenstechnik und Anforderungen an die Produktkonstruktion fur das KunststoffschweiBen mit Laserstrahlungn", pp. 1-56 (Sep. 2008).
(Continued)

*Primary Examiner* — Daniel H Lee
(74) *Attorney, Agent, or Firm* — Browdy and Neimark, PLLC

(57) ABSTRACT

A system for welding two parts to be joined made of thermoplastic synthetic materials along a weld seam by a laser operating with a laser beam having a beam direction within an operating field by a control method with control data corresponding to the weld-seam course to be produced, including a beam dimension in the region around its focus causing the welding, which is smaller in the joint plane than the target width of the weld seam to be produced, and is dependent upon the angle of incidence of the laser beam on the joint plane and/or upon the position of the focus relative (Continued)

to the joint plane, is displaced in a first movement component in a principal forward-feed direction along the track of the weld-seam to be produced, in a second, oscillating movement component superimposed over the former to cover the weld-seam width transversely to the principal forward-feed direction with an oscillation amplitude value, and is adjusted with a control method in its oscillation amplitude width in inverse dependence upon the beam dimension in the joint plane such that the width of the beam field covered by the laser beam in the transverse direction relative to the principal forward-feed direction corresponds to the target width of the weld seam.

23 Claims, 4 Drawing Sheets

(52) U.S. Cl.
CPC .... *B29C 66/1284* (2013.01); *B29C 66/12821* (2013.01); *B29C 66/229* (2013.01); *B29C 66/73921* (2013.01); *B29C 66/95* (2013.01); *B29C 65/1616* (2013.01); *B29K 2701/12* (2013.01)

(56) References Cited

FOREIGN PATENT DOCUMENTS

| DE | 102014210486 A1 | 12/2015 |
|---|---|---|
| WO | 2015185415 A1 | 12/2015 |

OTHER PUBLICATIONS

Boglea et al.,"Neue Strahlquellen erweitern Anwendungsbereich", Kunstoffe, pp. 133-137, vol. 07, No. 12 (Dec. 2007).
Roesner A. et al.,"Laserdurchstrahlschweißen von Thermoplasten. Ein Verfahren erobert den Kunststoffmarkt", pp. 28-32 (Sep. 2008).
"TWIST—neues Verfahren fur das Mikro-SchweiBen von Kunststoffen", p. 88, XP055202722 (Dec. 2007).
Gerhard O. et al.,"Thermische Simulation Der Schweissnahthomogenitat Beim TWIST—Laserschweissen", XP055202745, p. 81 (Mar. 2013).
Olowinsky et al.,"Einfluss Der TWIST—Parameter Auf Die Kunststoff-Schweissnaht", KP055202733, (Mar. 2012).
Aden et al.,"Optimierte Scan-Strategien Fur Hohe Nahtfestigkeiten Beim Kunststoffschweissen", XP055202741, p. 99 (Dec. 2013).

* cited by examiner

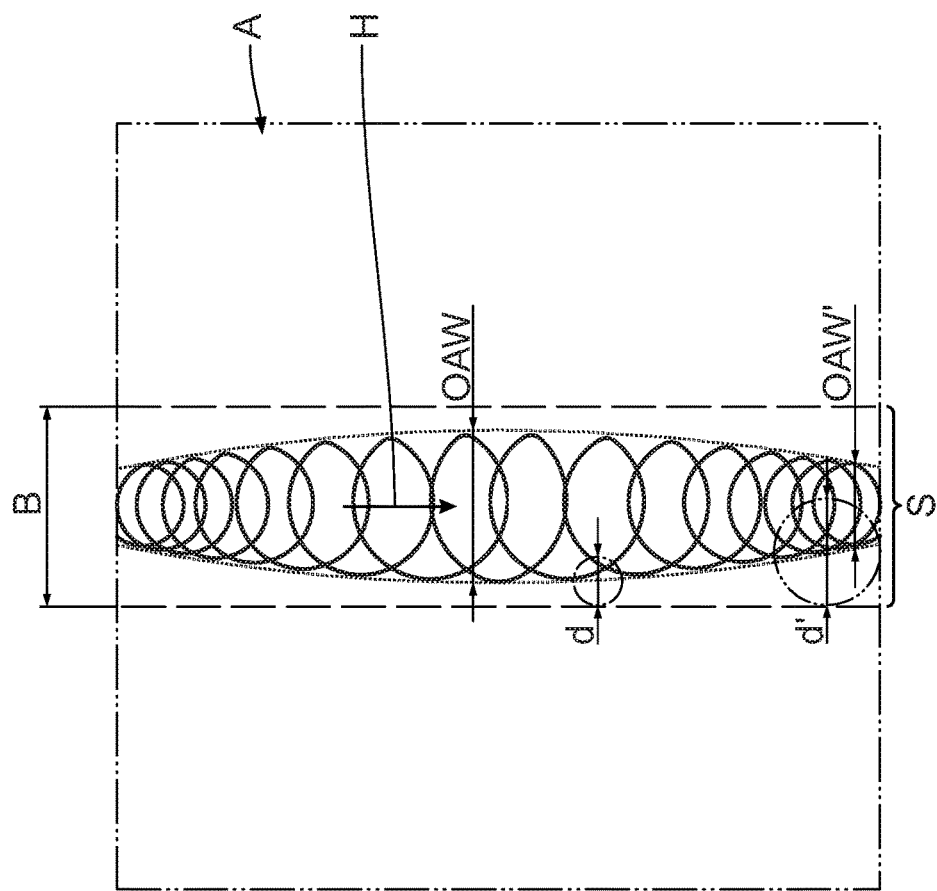

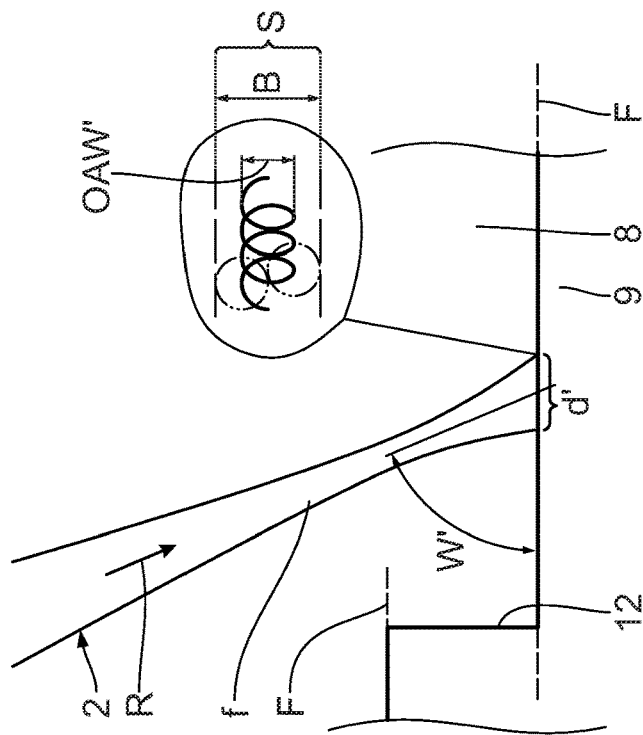
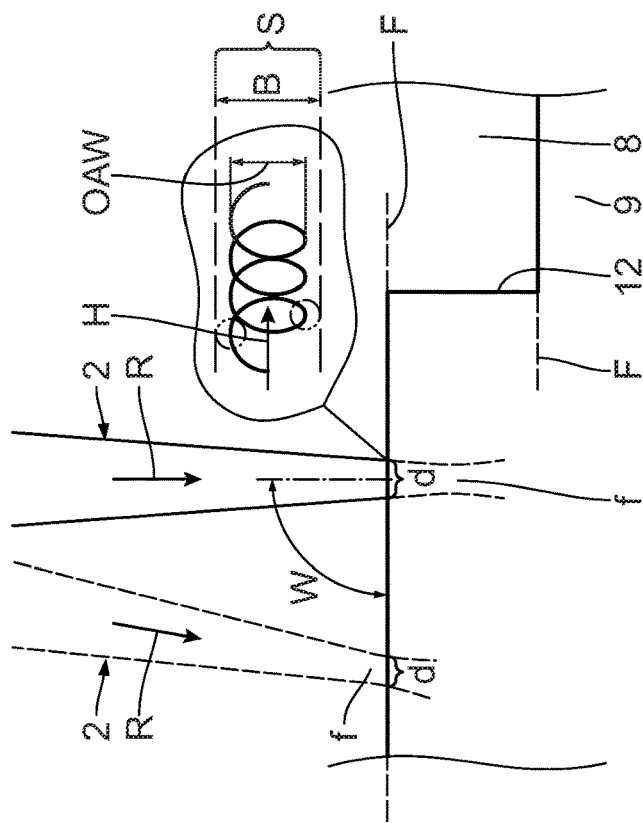

METHOD AND A DEVICE FOR THE WELDING OF TWO PARTS TO BE JOINED MADE OF THERMOPLASTIC SYNTHETIC MATERIALS ALONG A WELD SEAM BY MEANS OF LASER

CROSS-REFERENCES TO RELATED APPLICATIONS

This application claims the priority of the German patent application, Serial No. 10 2014 210 486.6, filed Jun. 3, 2014, the content of which is incorporated herein by reference in its entirety as if fully set forth herein.

FIELD OF THE INVENTION

The invention relates to a method for the welding of two parts to be joined made of thermoplastic synthetic materials along a weld seam by means of laser, wherein the laser beam
  is controlled in its beam direction within an operating field by a control method with control data corresponding to the weld-seam course to be produced,
  comprises a beam dimension, especially beam diameter in the region around its focus causing the welding, which is smaller in the joint plane than the target width of the weld seam to be produced, and is dependent upon the angle of incidence of the laser beam on the joint plane and/or upon the position of the focus relative to the joint plane, and
  is displaced in a first movement component in a principal forward-feed direction along the track of the weld seam to be produced, and
  in a second, oscillating movement component superimposed over the former in order to cover the weld-seam width transversely to the principal forward-feed direction with an oscillation amplitude width.

The invention further relates to a device for the welding of two parts to be joined made of thermoplastic synthetic materials along a weld seam, preferably in a laser transmission process, comprising
  a laser source,
  a clamping device for the parts to be joined,
  an optical laser-beam conditioning, especially comprising a collimation and focusing lens, and
  a scanner device for the guiding of the laser beam over the operating field along the weld seam to be formed between the two parts to be joined,

BACKGROUND OF THE INVENTION

This joining technique is known, for example, from DE 10 2004 056 782 A1 or DE 10 2007 049 362 A1. Substantially, in this context, the two suitably mounted and clamped parts to be joined are irradiated with a laser beam in an operating field along a weld seam to be produced, wherein the beam direction of the laser beam is controlled by a corresponding control method with control data corresponding to the weld-seam course to be produced. Furthermore, it is known here that the irradiation along the weld seam can be implemented using so-called contour welding, wherein each weld-seam position is irradiated by the laser beam once. As an alternative, a quasi-simultaneous welding can also be implemented, in which the laser beam is guided over the weld-seam course multiple times in short time intervals.

Furthermore, it is known from the named documents that the focal zone, that is, in particular, the beam diameter in the joint plane, is smaller than the width of the weld seam to be produced. In order to produce a weld seam of a corresponding width, the above-named DE 10 2004 056 782 A1 proposes moving the laser beam with its focal zone in a first movement component in a principal forward-feed direction along the track of the weld seam to be produced, and, in a second, oscillating movement component superimposed over the former, with an oscillation amplitude width, in order to cover the weld-seam width transversely to the principal forward-feed direction. In the case of a superimposition, for example, of a circular oscillating movement component over a rectilinear movement along the principal forward-feed direction, a spirally extending path of the laser focus is therefore obtained, wherein the successive spiral strokes overlap one another more or less strongly dependent upon the ratio between oscillation frequency and rate of forward-feed. Overall, through the supply of heat in the region irradiated by the laser focus in the joint plane, the thermoplastic material of at least one of the two parts to be joined is melted, and, through thermal conduction and melting of the second part to be joined, a welding is achieved between the two parts to be joined.

In terms of welding-plant technology, the welding method explained above is generally realised with a galvanometer scanner for beam deflection, through which the laser beam can be guided over a defined operating field by corresponding deflection. In this context, a so-called f-theta lens is used in the imaging optics, which has the property of focusing the beam falling through the lens to the side of the optical axis in such a manner that the focal position is disposed in the same plane as in the case of a beam which extends directly on the optical axis. Such an f-theta lens is typically constructed from a combination of two to four aspherical lenses, which are designed with a shape such that the focal-position adaptation functions well for a given wavelength.

In the case of laser welding, it is desirable for process regulation and control to couple measuring apparatus, such as a pyrometer, into the beam course. However, because of the f-theta lens, a lateral wandering apart of the weld spot and the optical axis of the pyrometer can occur if the scanner is increasingly deflected. To this extent, the detection of the weld spot by the pyrometer is no longer guaranteed.

Now, if the f-theta lens is omitted, the problem arises that, with increasing deflection from the optical axis of the laser plant, that is, with an increasing angle of incidence of the laser beam onto the joint plane, the laser beam is disposed with its focus outside the joint plane and is therefore de-focused, and the weld spot therefore becomes larger.

Furthermore, a de-focusing of the laser beam is also observed if the joint plane is displaced relative to the focal position, for example, if the two parts to be joined assume an at least slightly stepped course along the weld seam.

In fact, the de-focusing phenomena explained above are per se tolerable with regard to the energy input into the joint plane, however, with a given oscillation amplitude width, the irradiated area transversely to the principal forward-feed direction becomes larger as a result of the weld-spot widening with increasing deflection from the optical axis, so that the weld seam also becomes wider.

SUMMARY OF THE INVENTION

Starting from this, an object of the invention is to provide a method and a corresponding device for the welding of two parts to be joined, in which a defined weld-seam width is guaranteed without the use of an f-theta lens, regardless of the angle of deflection of the laser beam onto the joint plane and/or of the relative position of focal position to the joint plane.

This object is achieved by the control method, in which the oscillation amplitude width is adjusted in inverse dependence upon the beam dimension in the joint plane, preferably in dependence upon the beam diameter in such a manner that the width of the beam field scanned by the laser beam in the transverse direction relative to the principal forward-feed direction corresponds to the target width of the weld seam, according to which the oscillation amplitude width is adjusted in inverse dependence upon the beam dimension, in particular the beam diameter, in the joint plane, in such a manner that the width of the beam field scanned by the laser beam corresponds to the weld-seam width independently of the beam dimension in the transverse direction with reference to the principal forward-feed direction of the weld-seam width.

In other words, in the case of a widening of the beam dimension in the joint plane, that is, for example, in the case of a relatively larger beam diameter with more strongly deflected laser beam, the oscillation amplitude width is reduced, so that the maximal width of the corridor scanned by the laser beam, in which the weld seam is generated, corresponds to the target weld-seam width.

In terms of device technology, a per se known welding device according to the invention is controlled in its scanner device with such a control method.

The welding system according to the invention is characterised by the possibility for flexible use in a plurality of different requirement profiles in the context of synthetic-material welding. By comparison with known systems, an enlarged operating field with simultaneously small weld-spot can be realised through the use of a laser of high beam quality. Not only can a compensation of the de-focusing be realised in particular, but also, in general, a flexible adjustability of the weld-seam width can be realised without difficulty via the control of the oscillation amplitude width. Finally, an intelligent process control, for example by means of a pyrometer, can be integrated in a corresponding welding system without difficulty, because the restrictions associated with the f-theta lens used in the prior art, as described, do not occur.

It is advantageous that the second oscillating movement component of the laser beam is generated by a circular movement superimposed over the first, linear movement component. This oscillating movement component can be generated substantially through a genuine circular movement, elliptical circulating movements or also closed oscillating curves, for example, in the shape of a vertical or horizontal figure-of-eight. In each case, the oscillation amplitude width is adapted corresponding to the beam diameter present in the joint plane in such a manner that a constant target weld-seam width is generated.

Since the beam direction of the laser beam with reference to a given welding system stands in a known relationship with the focus dimension in the joint plane, the corresponding oscillation amplitude width can be adjusted dependent upon the beam direction of the laser beam using simple control technology on the basis of the control data for the beam direction of the laser beam. Accordingly, the angle of deflection of the laser beam as the parameter determining the beam direction can be used as a basis for specifying the oscillation amplitude width.

Additionally or alternatively to the above specification of the oscillation amplitude width, with the method according to the invention, a limited three dimensionality of the parts to be joined can also be compensated, for example, also in the case of a stepped course of the joint plane, in order to adapt the oscillation amplitude width correspondingly to the variation in the beam diameter in the joint plane caused by the step. The shape data of the two parts to be joined, which are stored in the control of the welding system can then be used to specify the oscillation amplitude width.

According to a further preferred embodiment of the method according to the invention, the focal position in a central region of the operating field below the joint plane between the two parts to be joined there or respectively in an edge region of the operating field above the joint plane between the two parts to be joined there can be adjusted. Accordingly, a minimum possible variation of the beam dimension over the entire operating field is achieved in both directions.

Preferred oscillation frequencies of the second movement components are disposed in the kHz range, preferably between 0.25 kHz and 12 kHz, by particular preference between 3 kHz and 6 kHz.

With regard to the possibility of dispensing with an f-theta lens in the context of the compensation according to the invention of the oscillation amplitude width, in a practical respect, the operating field can comprise an area between approximately 500×500 mm$^2$ and 1200×1200 mm$^2$, preferably approximately 650×650 mm$^2$.

The design of the laser optic is preferably such that the focus of the laser beam comprises a minimal spot diameter from 0.3 mm to 0.7 mm, preferably of 0.4 mm This dimensioning allows a sufficiently large process window for the production of a weld seam with a weld-seam width in the millimeter range by means of the superimposed forward-feed and oscillation movement.

In an advantageous manner, a beam with a high beam quality in the range of $M^2$=1.0-1.4 is used for the production of the beam. Accordingly, the conditions are created for achieving a comparatively high radiance in the region of the joint plane.

According to another preferred further development of the method according to the invention, the beam diameter of the laser beam is disposed, because of the arrangement of the collimation and focusing optic there, upstream in the beam direction of the scanner device, in a range between 3 mm and 10 mm, so that the scanner mirrors generally used in the region of the reflected beam diameter can be subjected to a restricted lumination.

The invention also relates to a device for the welding of two parts to be joined made of thermoplastic synthetic materials along a weld-seam, preferably using the laser transmission process with
 a laser source,
 a clamping device for the parts to be joined,
 an optical laser beam conditioning, especially comprising
  a collimation and focusing lens optic, and
 a scanner device for the guiding of the laser beam over the
  operating field along a weld seam to be formed between
  the two parts to be joined.

The device according to the invention is characterised in that the scanner device is controlled by a control method according to the invention in such a manner that the oscillation amplitude width is adjusted in inverse dependence upon the beam dimension in the joint plane, in such a manner that the width of the beam field scanned by the laser beam in the transverse direction with reference to the principal forward-feed direction corresponds to the target width of the weld-seam.

Regarding the advantages of this device according to the invention, reference can be made to the corresponding deliberations relating to the corresponding control method.

According to a preferred embodiment, a fibre laser is used in this context for the welding device. By preference, a beam coupling by means of single mode fibre is implemented. As a result of this laser with good beam quality in combination with the scanner device, it is possible to achieve a large operating field at the same time as comparatively small beam diameters. Furthermore, a relatively large Rayleigh length of the beam focus is also achieved in this context.

In principle, it is possible to use an oscillating mirror device as the scanner device, which ensures both the forward-feed movement of the laser beam along the weld-seam direction and also the oscillation movement transversely to the former. This represents a rational variant in terms of device technology.

However, a first scanner unit for the generation of the first movement component of the laser beam along the principal forward-feed direction and a second scanner unit connected upstream of the first scanner device for the generation of the second movement component transversely to the principal forward-feed direction can be provided as an alternative. Through the decoupling of the components responsible for the deflection of the beam, the latter can be adapted optimally to the respectively required dynamics Accordingly, the oscillation of the second movement component in the kHz range is significantly more dynamic, but provided with a considerably smaller amplitude than the movement in the principal forward-feed direction. The latter takes place, for example, with a forward-feed rate in the order of magnitude of a few hundred to a few thousand millimeters per second.

Regarding the scanner unit for generating the oscillation of the second movement component, a resonance scanner or an acousto-optic deflector can be provided.

Finally, in a further preferred embodiment, mirrors made of quartz glass are used in the scanner units. This deviates from the conventional mirrors made from silicon carbide, although the latter are lighter and accordingly easier to set into a high-frequency scanning motion. However, the absorption capacity of the silicon carbide material is problematic for the residual radiation of the laser passing through the mirror layer, which leads to a heating of the silicon carbide substrate. This leads to a risk of failure of the adhesion point between the substrate and the scanner drive. By contrast, quartz glass is not absorptive for the IR radiation used in the present case. Residual radiation passing through the mirror layer is absorbed in the scanner housing or a corresponding radiation trap. Accordingly, in the welding system according to the invention, it is possible to use a laser with a significantly higher radiance.

Further features, details and advantages of the invention are specified in the following description of an exemplary embodiment of the invention on the basis of the attached drawings.

BRIEF DESCRIPTION OF THE DRAWINGS

FIG. 2 shows a considerably enlarged, schematic plan view of the operating field of the laser welding plant in the joint plane, FIG. 3A and B show a detail from FIG. 2 illustrating the oscillation amplitude width dependent upon the beam diameter, and FIG. 4A and B show schematic, considerably enlarged detail sections through two parts to be joined vertically to the joint plane in the region of an abrupt change in the joint plane.

DESCRIPTION OF THE PREFERRED EMBODIMENT

Figure 1:
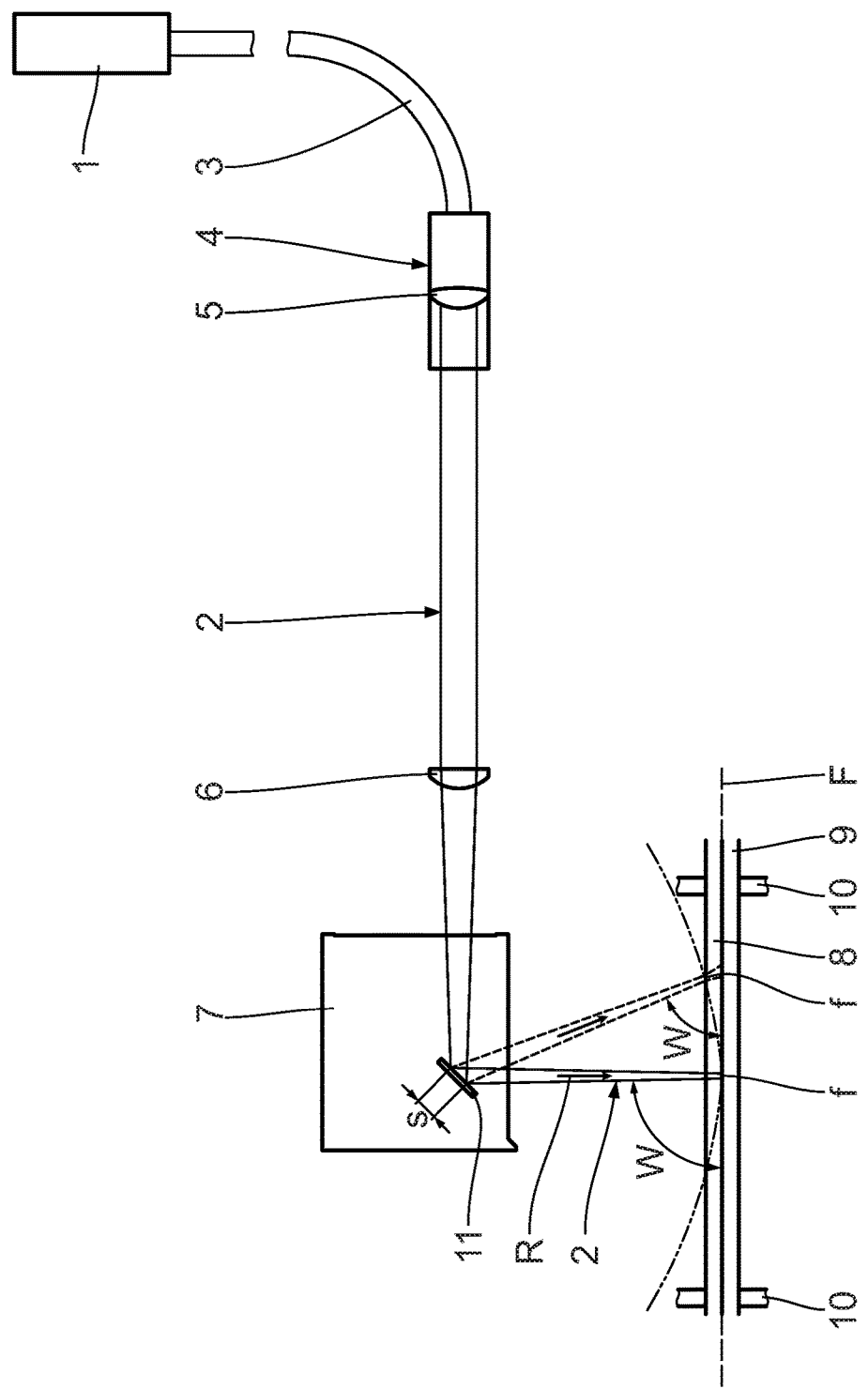
FIG. 1 shows a schematic view of a laser welding device.

As is clearly evident from FIG. 1, a laser welding device controlled according to the invention comprises a fibre laser 1 as radiation source, of which the laser beam 2 is coupled into the system via a single-mode fibre 3. In this context, the laser beam 2 is fed from the fibre 3 into the collimation device 4, which comprises a collimation lens 5.

The laser beam 2 collimated in this manner is focused by means of a focusing lens 6 with a defined focal length.

The focused laser beam 2 is directed by means of the scanner device 7, corresponding to a control method still to be explained, onto the two parts to be joined 8, 9 and guided there, on the one hand, in a first movement component in order to form a weld seam S in the joint plane F along a principal forward-feed direction H. In this context, the two parts to be joined 8, 9 are held by means of a clamping device 10 in sufficient contact with one another so that the known laser transmission welding can be used to produce the weld-seam S. Accordingly, the upper part to be joined 8 is transmissive for the laser beam 2, while the lower part to be joined 9 is absorptive. The radiated energy of the laser beam 2 leads to a melting of the lower part to be joined 9, through thermal conduction, the upper part to be joined 8 is also melted, and a substance-fit connection between both parts to be joined 8, 9 is formed along the path of the laser beam 2.

On the other hand, since the beam diameter d is significantly smaller than the target width B of the weld-seam to be placed, in order to cover the target width B, the laser beam 2 is provided with a second, oscillating movement component transversely to the principal forward-feed direction H, which can be, for example, a high-frequency circular movement approximately between 3 and 6 kHz. Accordingly, through a superimposition over the movement in the principal forward-feed direction H, a spiral movement of the laser beam 2 readily visible in FIG. 2 is obtained. Dependent upon the ratio of the velocity in the principal forward-feed direction H and the oscillation frequency of the oscillating movement component transversely to the latter, successive spiral paths overlap one another to a greater or lesser extent.

Under given marginal conditions, both parts to be joined 8, 9 can otherwise also be substantially transmissive for the laser beam 2. In spite of this, with high focusing of the laser beam 2, a given residual absorption capacity is sufficient to achieve a sufficient energy absorption and a melting of the two parts to be joined 8, 9. EP 1 098 751 B1 describes a corresponding method according to which two highly transparent materials can be processed because of intrinsic absorption in the wavelength range 1.8-2.2 μm.

In the scanner device 7, only one scanner mirror 11 is shown schematically in FIG. 1. In general, in order to cover a two-dimensional operating field A (FIG. 2), two mirrors are used, of which each allows the deflection of the laser beam 2 along an axis x or respectively y. The beam diameter s of the laser beam 2 on the mirror 11 in this context is disposed in the order of magnitude between 3 mm and 10 mm.

The problem underlying the invention as described in the introduction can be explained once again with reference to FIG. 1. Accordingly, the laser beam 2 striking vertically on the parts to be joined 8, 9 is arranged centrally in the operating field A of the welding device and comprises a comparatively small dimension, that is, a small beam diameter d.

In the case of a deflection of the laser beam 2 outwards from the central region, so that the beam direction R assumes an angle of incidence W smaller than 90° with the joint plane F, the optical path from scanner-mirror to joint plane F is lengthened, and—since no f-theta optic is used for compensation—the focus f of the laser beam 2 is shifted upwards relative to the joint plane F. Accordingly, the beam diameter d in the region of the joint plane F between the two parts to be joined 8, 9 is enlarged, and the shape is at least slightly elliptical.

In the enlarged FIG. 2, the variation of the beam diameter d in the joint plane with increasing deflection of the laser beam 2 outwards from the central region is suggested schematically. In the central region of the operating field A, the beam diameter d is small, while the beam diameter d' in the edge region of the operating field is large. Now, to guarantee that the enlarged beam diameter d' does not lead to a wider weld-seam S, the oscillation amplitude width OAW entered as a dotted line in FIG. 2 corresponding to the beam diameter d, that is corresponding to the deflection and the angle of incidence W of the laser beam 2 resulting from this, is adapted in such a manner that, independently of the position in the operating field A and the deflection, a beam field transversely to the principal forward-feed direction H, which corresponds to the target width B of the weld-seam S, is always covered by the laser beam 2. In the central region, the oscillation amplitude width OAW is therefore large because of the small beam diameter d, and the reverse applies in the edge region. A small oscillation amplitude width OAW' compensates a large beam diameter d'.

Figure 3B:
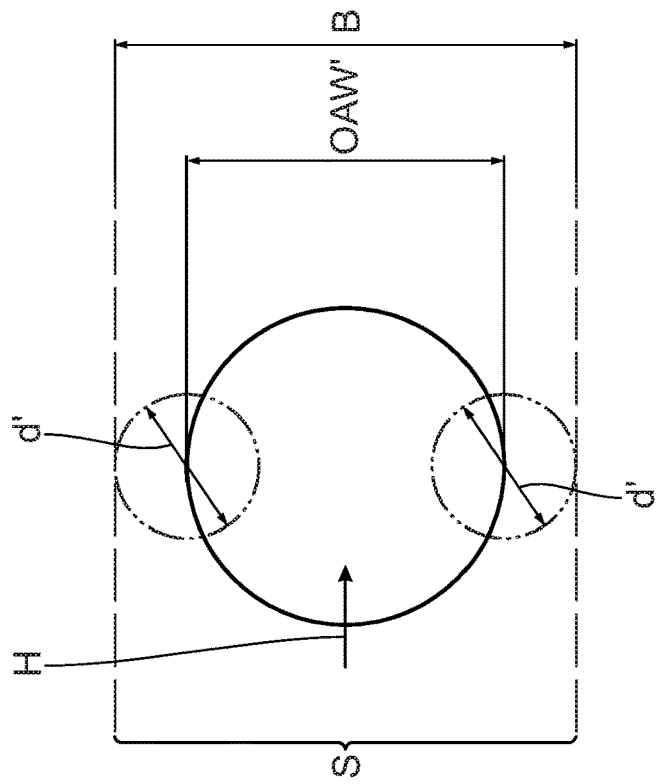
Figure 3A:
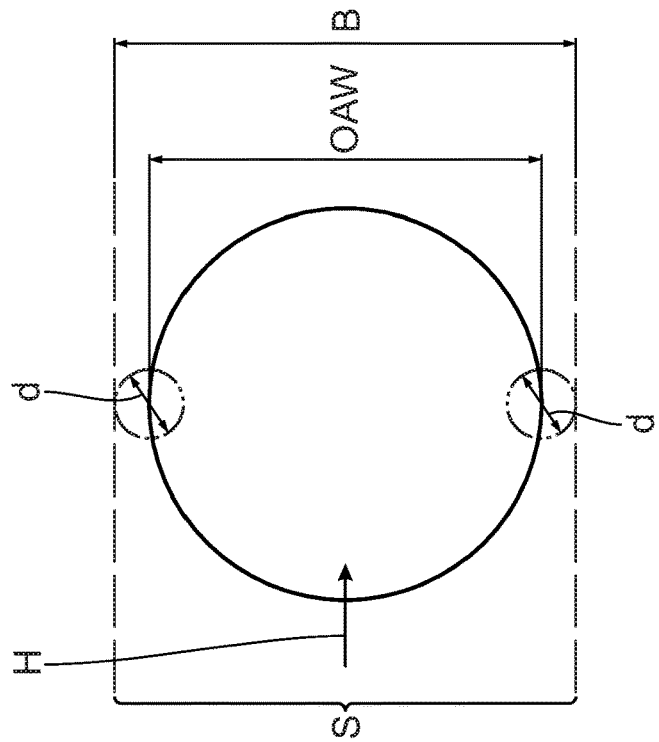

By way of explanation, this relationship is illustrated at greater resolution with a pure circular movement of the laser beam 2 in FIG. 3A and B. FIG. 3A represents a situation in the central region of the operating field A. The beam diameter d is small, so that the oscillation amplitude width OAW is large, in order to adjust the beam field corresponding to the target width B of the weld-seam S.

In FIG. 3B, a situation with deflected laser beam 2 is illustrated, so that the beam diameter d' is larger by comparison with the situation in FIG. 3A. Accordingly, the oscillation amplitude width OAW' is adjusted to be smaller, so that the target width B of the weld-seam S to be produced with it remains unchanged.

In FIGS. 4A and B, a situation is illustrated which reproduces the travel over a step 12 in the surface topography of the two parts to be joined 8, 9. In FIG. 4A, the laser beam 2 is deflected comparatively slightly, so that the angle of incidence W is disposed at around 90°. In principle, in this context, it should be noted that the welding system is designed so that, in the case of non-deflected laser beam, that is, an angle of incidence W of 90°, the focus f is disposed somewhat below the joint plane F between the two parts to be joined. With an increasing deflection of the laser beam 2, as suggested with dashed lines on the left in FIG. 4A, the focus f wanders into the joint plane F and then upwards beyond it. This design means that the variation of the beam diameter d over the width of the operating field A is significantly reduced by comparison with a system design in which the focus in the case of a non-deflected laser beam 2 is disposed in the joint plane F.

Now, FIG. 4B illustrates the situation after travelling over the step 12, where, up to the joint plane F, an optical path for the laser beam 2, which is longer by at least the height of the step 12, must be travelled. Beyond this, a further enlargement of the optical path through the stronger deflection with the angle of incidence W' is observed, so that the laser beam strikes the joint plane F with a larger beam diameter d'. Here also, for the compensation, the oscillation amplitude width OAW' is reduced by comparison with the situation in FIG. 4A, as is visualised by comparison of the two plan views inserted in FIGS. 4A and B.

In this context, the step 12 can be included by the software in the control of the laser beam movement, on the one hand, via the shape coordinates of the parts to be joined 8, 9 stored in the control. On the other hand, it is also possible to carry out the adaptation of the control parameters on the basis of a distance measurement implemented by the scanner, for example, on the basis of a confocal, chromatic measurement or a laser triangulation.

The invention claimed is:

1. A method for welding two parts to be joined made of thermoplastic synthetic materials along a weld seam by a laser, wherein a laser beam generated by the laser is controlled in its beam direction within an operating field by a control method with control data corresponding to the weld seam course to be produced, the laser beam comprising a beam dimension in the region around its focus causing the welding, which is smaller in a joint plane than a target width of the weld seam to be produced, and is dependent upon at least one of an angle of incidence of the laser beam on the joint plane a and a position of the focus relative to the joint plane, and wherein the laser beam is displaced in a first movement component in a principal forward-feed direction along a track of the weld seam to be produced, and in a second, oscillating movement component superimposed over the former in order to cover the weld-seam width transversely to the principal forward-feed direction with an oscillation amplitude width, wherein the control method comprises adjusting the oscillation amplitude width in inverse dependence upon the beam dimension in the joint plane in such a manner that the width of the beam field scanned by the laser beam in the transverse direction relative to the principal forward-feed direction corresponds to the target width of the weld seam.

2. The method according to claim 1, wherein, with the control method, the oscillation amplitude width is adjusted depending on the beam diameter.

3. The method according to claim 1, wherein the second, oscillating movement component of the laser beam is generated by a circular movement superimposed on the first, linear movement component.

4. The method according to claim 1, wherein the beam dimension in the joint plane upon which a specification of the oscillation amplitude width is based is determined from the control data of the beam direction of the laser beam.

5. The method according to claim 4, wherein the angle of incidence of the laser beam on the joint plane is used as a basis for the specification of the oscillation amplitude width.

6. The method according to claim 5, wherein shape data of the two parts to be joined in the joint plane are used as a basis for the specification of the oscillation amplitude width.

7. The method according to claim 1, wherein the position of the focus is adjusted in at least one of a central region of the operating field below the joint plane between the two parts to be joined there and in an edge region of the operating field above the joint plane between the two parts to be joined there.

8. The method according to claim 1, wherein the oscillation frequency of the second movement component is disposed in the range of 0.25kHz to 12 kHz.

9. The method according to claim 1, wherein the oscillation frequency of the second movement component is disposed in the range of 3-6 kHz.

10. The method according to claim 1, wherein the operating field comprises an area between 500 mm×500 mm and 1200 mm×1200 mm.

11. The method according to claim 1, wherein the operating field comprises an area of 650 mm×650 mm.

12. The method according to claim 1, wherein the focus of the laser beam comprises a minimal spot diameter from 0.3 mm to 0.7 mm.

13. The method according to claim 1, wherein the focus of the laser beam comprises a minimal spot diameter of 0.4 mm.

14. The method according to claim 1, wherein a laser with high beam quality in the range of $M^2=1.0-1.4$ is used for the generation of the beam.

15. The method according to claim 1, wherein the beam diameter of the laser beam on a scanner device for the guiding of the laser beam over the operating field is disposed in a range between 3 mm and 10 mm.

16. A device for welding two parts to be joined made of thermoplastic synthetic materials along a weld seam, in a laser transmission process, comprising:
a laser source,
a clamping device for the parts to be joined,
an optical laser-beam conditioning and focusing lens, and
a scanner device for the guiding of the laser beam over the operating field along the weld seam to be formed between the two parts to be joined,
wherein the scanner device is controlled by a control method according to claim 1.

17. The device according to 16, comprising the use of a fiber laser.

18. The device according to claim 16, comprising the use of a beam coupling by means of single-mode fiber.

19. The device according to claim 16, wherein the optical laser beam conditioning is positioned with the collimation and focusing lens upstream of the scanner device.

20. The device according to claim 16, wherein as the scanner device, a single oscillating mirror unit is provided, which ensures both the guiding of the laser beam along the principal forward-feed direction with the first movement component and also the oscillation movement corresponding to the second movement component transversely to the principal forward-feed direction.

21. The device according to claim 16, comprising one of a resonance scanner and an acousto-optic deflector as the second scanner unit for the generation of the beam oscillation.

22. The device according to claim 16, wherein mirrors made of quartz glass are used in the scanner device.

23. The device according to claim 16, wherein the scanner device comprises a first scanner unit for the generation of the first movement component of the laser beam along the principal forward-feed direction and a second scanner unit connected upstream of the first scanner device for the generation of the second movement component transversely to the principal forward-feed direction.

* * * * *